(12) United States Patent
Wikman

(10) Patent No.: US 7,047,011 B1
(45) Date of Patent: May 16, 2006

(54) SYNCHRONIZATION IN DIVERSITY HANDOVER

(75) Inventor: Anders Wikman, Umeå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/501,570

(22) Filed: Feb. 10, 2000

(51) Int. Cl.
*H04Q 7/20* (2006.01)
*H04B 7/01* (2006.01)

(52) U.S. Cl. .................. 455/442; 455/436; 455/502; 370/324; 375/356

(58) Field of Classification Search ............ 455/436, 455/502, 442, 437–439; 370/324, 350, 503, 370/510, 512, 516, 519; 375/355, 356
See application file for complete search history.

(56) References Cited

U.S. PATENT DOCUMENTS

| | | | |
|---|---|---|---|
| 5,239,557 A | | 8/1993 | Dent |
| 5,268,933 A | | 12/1993 | Averbuch |
| 5,509,035 A | | 4/1996 | Teidemann, Jr. et al. |
| 5,711,003 A | | 1/1998 | Dupuy |
| 5,828,659 A | | 10/1998 | Teder et al. |
| 5,872,820 A | * | 2/1999 | Upadrasta .................. 375/356 |
| 5,883,888 A | * | 3/1999 | St-Pierre ..................... 370/331 |
| 6,108,546 A | * | 8/2000 | Kusaki et al. ............. 455/436 |
| 6,208,871 B1 | * | 3/2001 | Hall et al. .................. 455/517 |
| 6,226,274 B1 | * | 5/2001 | Reese et al. ................ 370/280 |
| 6,243,372 B1 | * | 6/2001 | Petch et al. ................. 370/350 |
| 6,307,840 B1 | * | 10/2001 | Wheatley et al. ........... 370/252 |
| 6,366,786 B1 | * | 4/2002 | Norman et al. ............. 455/502 |

FOREIGN PATENT DOCUMENTS

| | | |
|---|---|---|
| EP | 0954115 A1 | 11/1999 |
| WO | 95/08899 | 3/1995 |
| WO | 00/28744 | 5/2000 |

* cited by examiner

*Primary Examiner*—Simon Nguyen
(74) *Attorney, Agent, or Firm*—Nixon & Vanderhye P.C.

(57) ABSTRACT

To avoid signal quality degradation in resynchronization procedures, a base station and a mobile station do not adjust their timing simultaneously. Generally, a timer or a clock in each of the mobile and base stations is not adjusted at the same time. For example, the timing of the base station may be changed during a first time interval while that of the mobile station may be changed during a second, different time interval. In one example, non-limiting embodiment, a radio network controller determines the difference between the base station timing and the timing of the radio network controller. If that difference exceeds a threshold, the radio network controller determines a timing adjustment based upon the difference. The timing adjustment is communicated to the base station which incrementally adjusts its timing during a first set of time intervals. The mobile station detects the base station timing and adjusts its own timing during a second set of intervals. The base station may adjust its timing only at odd time intervals, such as odd system frame numbers, and the mobile station may adjust its timing only at even time intervals, such as even system frame numbers, or vice versa.

16 Claims, 3 Drawing Sheets

SYNCHRONIZATION IN DIVERSITY HANDOVER

FIELD OF THE INVENTION

The present invention relates to code division multiple access (CDMA) communication in cellular radio communication systems, and more particularly, to diversity handover synchronization.

BACKGROUND AND SUMMARY OF THE INVENTION

Direct sequence code division multiple access (DS-CDMA) allows signals to overlap in both time and frequency so that CDMA signals from multiple users simultaneously operate in the same frequency band or spectrum. In principle, a source information digital data stream to be transmitted is impressed upon a much higher rate data stream generated by a pseudo-random noise (PN) code generator. This combining of a higher bit rate code signal with a lower bit rate data information stream "spreads" the bandwidth of the information data stream. Each information data stream is allocated a unique PN or spreading code (or a PN code having a unique offset in time) to produce a signal that can be separately received at a receiving station. From a received composite signal of multiple, differently-coded signals, a PN coded information signal is isolated and demodulated by correlating the composite signal with the specific PN spreading code associated with that PN coded information signal. This inverse, de-spreading operation "compresses" the received signal to permit recover of the original data signal and at the same time suppresses interference from other users.

Space diversity (sometimes called macrodiversity) is attained by providing multiple signal paths through simultaneous links from a mobile station to two or more base stations. When the mobile station is in communication with two or more base stations, a single signal for the mobile user is created from the signals from each base station. This diversity communication is sometimes referred to as "soft" handover in that communication with a destination base station is established before communication with the source base station is terminated, i.e., a make-before-break type of handover. Thus, after a call is initiated and established between a mobile station and a source base station, the mobile station continues to scan a broadcast signal transmitted by base stations located in neighboring cells. Broadcast signal scanning continues in order to determine if one of the neighboring base station transmitted signals is strong enough for a handover to be initiated. If so, this determination is provided to the radio network which sends the appropriate information to the mobile station and to the new destination base station to initiate the diversity handover. The new base station searches for and finds the mobile station's transmitted signal using the associated spreading code. The destination base station also begins transmitting a downlink signal to the mobile station using the appropriate spreading code. The mobile station searches for this downlink signal and sends a confirmation when it has been received.

In each cell, the base station selects the strongest paths for demodulation. The demodulated information from each of these strongest paths are combined using, for example, some form of maximal ratio combining. In addition, the radio network combines the two (or more) versions of the mobile station uplink signal from the base stations involved in a diversity soft handover, and either selects the signal with the best quality or combines the signals to achieve an optimal signal. The result of these various combining and selecting operations is a greatly improved resistance to fading and other adverse influences often encountered in mobile radio communications.

Diversity handover requires timing synchronization between the source and destination base stations and the mobile station. All nodes involved in a macrodiversity handover should be synchronized on a frame level so that the same frame is sent from all base stations involved in the handover to the mobile station at the same time. Frame level synchronization between the diversity handover base stations may be accomplished using a system frame number (SFN) counter in each of the nodes or using some other common internal clocking mechanism. In this description, the diversity handover nodes include a radio network controller (RNC), a source radio base station, a destination radio base station, and a mobile station. The system frame number counters in each of these nodes must be synchronized within some relatively small deviation. The RNC may periodically perform phase measurements to determine any deviation between the value in its system frame number counter and the value in each of the source and destination base station system frame number counters. If the deviation is out of tolerance, the RNC may order one or both of the source and destination base stations to adjust its respective system frame number counter. In order to avoid losing entire frames or symbols, this adjustment is preferably performed in small incremental steps such as one-eighth of a chip or some other multiple of the internal clock. A smaller increment reduces the degree to which the received signal is degraded.

The mobile station also adjusts its timing in order to be synchronized to the RNC and source and destination base stations. Such adjustment is typically a necessary and continuing process due to the mobility of the mobile station. Typically, the mobile station locks its timing to that of the source base station by monitoring timing information included in the source base station's broadcast channel and adjusting the mobile's internal clock accordingly in small increments. Accordingly, during a macrodiversity handover, the source and destination base stations as well as the mobile station may often be adjusting their respective timing mechanisms at the same time. As a result, there is a risk that as the mobile station adjusts its timing in one direction, e.g., forward, the base station adjusts its timing in the opposite direction, e.g., backward. Thus, the total timing adjustment and its degrading effect on the quality of the received signal at both the base station and the mobile station significantly increase when the timing adjustments move in opposite directions. For example, if the mobile station adjusts its timing by one-eighth of a chip duration in one direction and the radio base station one-eighth of a chip duration in the opposite direction, the total timing adjustment in the received signal is effectively one-fourth of a chip duration.

The present invention avoids this degradation in signal quality by ensuring that a base station and a mobile station do not adjust their timing simultaneously. Generally, a timer or a clock in each of the mobile and base stations is not adjusted at the same time. For example, the timing of the base station may be changed during a first time interval while that of the mobile station may be changed during a second different time interval. A radio network controller determines the difference between the base station timing and the timing of the radio network. If that difference exceeds a threshold, the radio network controller determines a timing adjustment based on the difference. The timing adjustment is communicated to the base station which incrementally adjusts its timing during the first set of time intervals. The mobile station detects the base station timing and adjusts its own timing during a second set of time intervals. In one example, non-limiting embodiment, the base station may adjust its timing only at odd time intervals, such as odd system frame numbers, and the mobile station may adjust its timing only at even time intervals, such as even system frame numbers (or vice versa).

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts throughout. While individual functional blocks and components are shown in many of the figures, those skilled in the art will appreciate these functions may be performed by individual hardware circuits, by a suitably programmed digital microprocessor or general purpose computer, by an application specific integrated circuit (ASIC), and/or by one or more digital signaling processors (DSPs).

DETAILED DESCRIPTION OF THE DRAWINGS

In the following description, for purposes of explanation and not limitation, specific details are set forth, such as particular embodiments, circuits, signal formats, techniques, etc. in order to provide a thorough understanding of the present invention. For example, while the present invention has particular applicability to diversity handover situations, it may also be applied to any synchronization procedure between one or more base stations and a mobile station, or two radios for that matter. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
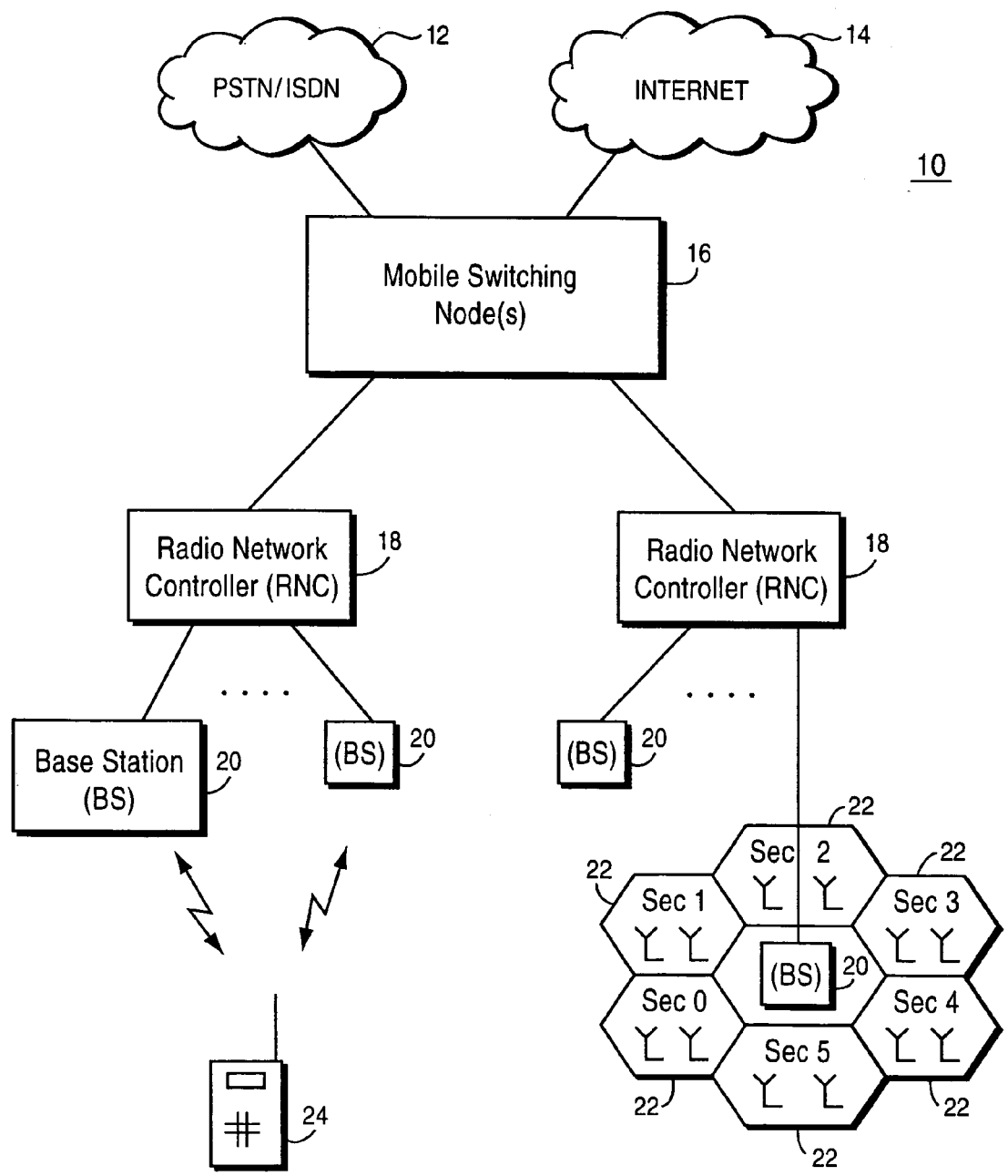
FIG. 1 is a function block diagram of an example cellular radio communications system in which the present invention may be employed.

The present invention is described in the context of a CDMA (including any type of CDMA system) mobile radio telecommunications system 10 as shown in FIG. 1. A representative, circuit-switched, external core network shown as cloud 12, may be for example the Public Switched Telephone Network (PSTN) and/or the Integrated Services Digital Network (ISDN). A representative, packet-switched, external core network shown as cloud 14, may be for example the Internet. Both core networks are coupled to one or more service nodes. For simplicity, only a single block of mobile switching nodes 16 is shown that provides circuit and/or packet switching services. The mobile switching node 16 is connected to a plurality of radio network controllers (RNCs) 18. Each radio network controller 18 establishes and releases a particular radio channel (i.e., one or more spreading codes) between one or more base stations ($BS_S$) 20 and mobile station (MS) 24. Accordingly, the RNCs manage the selection and allocation of spreading codes and diversity handovers. The base station 20 handles the wideband CDMA radio interface to mobile station 24 and includes radio equipment such as transceivers, digital signal processors, and antennas required to serve each cell and cell sector in the network. As shown for one base station 20, each base station may include multiple sectors 22, and each sector preferably includes two diversity antennas.

The mobile station 24 is depicted with connection legs with two base stations 20 to illustrate a diversity handover. Each leg includes an uplink connection and a downlink connection. The base station where the connection is already established is the source base station ($BS_S$), and the base station with which the connection is being or has more recently been established is the destination base station ($BS_D$). In order to ensure accurate synchronization between the source and destination base stations and the mobile station, all three of these nodes must be synchronized within a relatively small deviation. One way in which this synchronization may be achieved and maintained is to ensure that the internal clocks or timers in each of these nodes register at approximately the same time. Synchronizing a system frame number (SFN) counter in each of these nodes may also be used to ensure that the same frame is being sent from both source and destination base stations to the mobile station at the same time.

Figure 2:
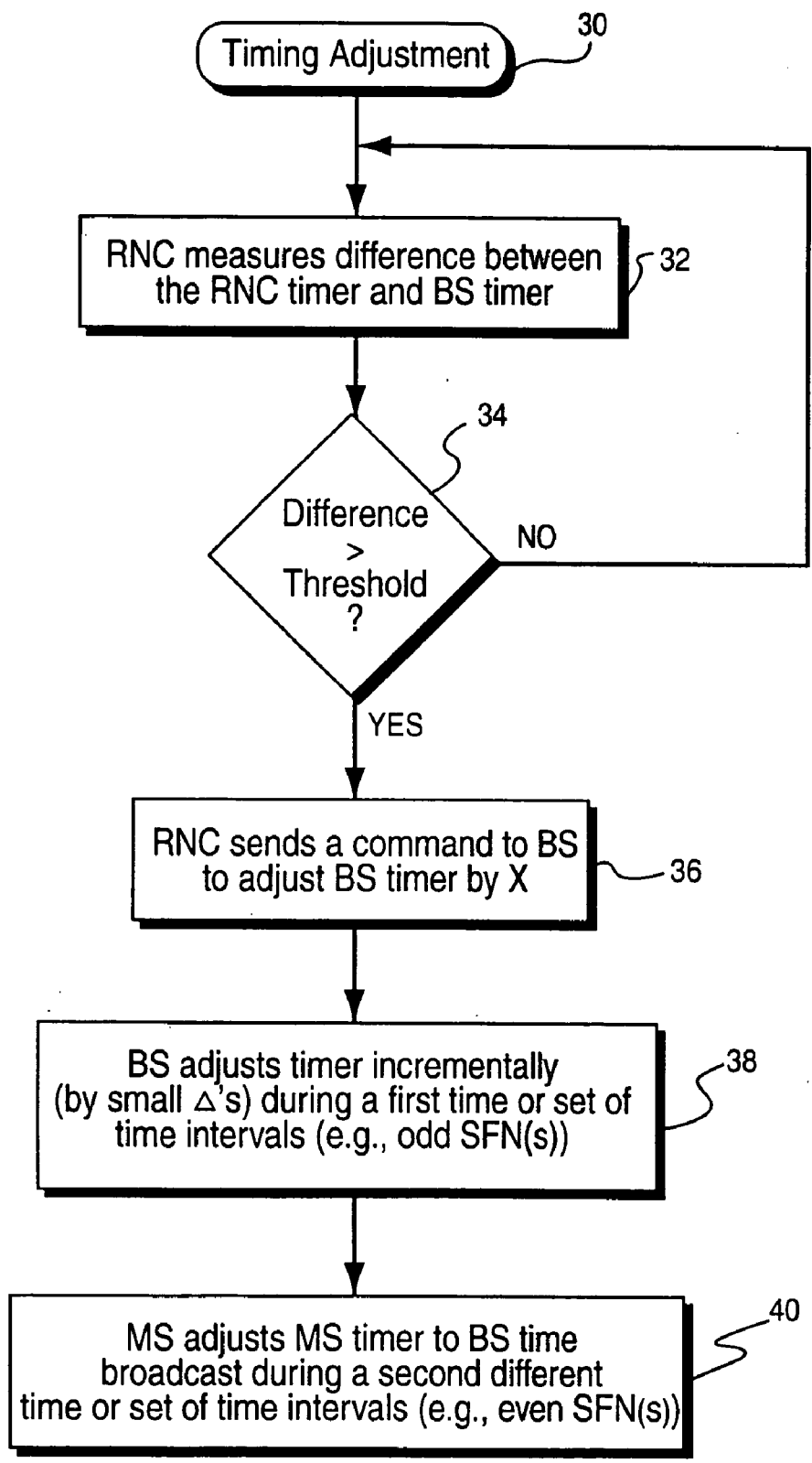
FIG. 2 is a flowchart of timing adjustment procedures in accordance with one example, non-limiting embodiment of the present invention.

As described in the background, adjusting the internal clock or SFN counter in a base station being monitored by the mobile station at the same time the mobile station adjusts its internal clock or SFN counter may result in a cumulative or constructive time shift adjustment that degrades the quality of the received signal. The present invention controls timing adjustments performed in each of the base station and the mobile station such that constructive time shifts, and the resulting loss in signal quality, are avoided. In this regard, reference is now made to the timing adjustment routine (block 30) shown in FIG. 2. This routine illustrates one example, non-limiting timing adjustment method.

The RNC receives timing reports from each of its base stations. The RNC measures the difference between an RNC or system timer, such as an internal clock or a system frame number counter, and the base station time as indicated by a base station internal clock or a base station system frame number counter value(s) contained in the timing report(s) (block 32). The difference or drift is compared with a threshold (block 34). If the difference is less than or equal to the threshold, no timing adjustment is made, and the RNC continues to measure the difference between this time and other base station times (block 32).

If the difference exceeds the threshold, the RNC sends a command to that base station to adjust its timing by a prescribed amount "X" based upon the difference determined in block 34 (block 36). That timing adjustment amount "X" may be significant, e.g., 0.5 milliseconds. Rather than implement the full timing adjustment amount in a single adjustment, the base station preferably makes that adjustment in small incremental steps, e.g., on the order of one-quarter of a chip at a time. Of course, other incremental sizes may be appropriate. Assuming an example system where the chip rate over the air interface is 3.84 MHz, the internal clock could have a frequency of 30.72 MHz, (i.e., 8×3.84 MHz), where one-fourth of a chip corresponds to approximately 60 nanoseconds. An example system frame counter may count in one-eighth chip increments corresponding to 30 nanoseconds.

The base station adjusts its timer, e.g., an SFN counter or internal clock, using small increments such as one-quarter chip intervals during a first time interval or a first set of time intervals. In the non-limiting, SFN counter example, that first time might correspond to one or more odd (or even) system frame numbers, depending on the size of the adjustment to be made (block 38). The base station may be either (1) a single base station with which the mobile station is currently communicating or (2) one of plural base stations involved in a diversity handover, such as the source base station. The mobile station monitors a base station broadcast channel of a single base station. The mobile station detects the following: (1) the system frame number (SFN) in the base station to which the mobile station sets its SFN, and (2) the time when a new frame on the broadcast channel starts. The SFN in the mobile station may have an integral value and a fractional value.

The mobile station "follows" the timing of the base station and adjusts its internal clock/SFN counter whenever a drift is detected relative to the broadcast base station timing. Such a drift may be caused simply because no clock is perfect. Moreover, drift occurs because of the movement of the mobile station relative to the base station. That movement means the mobile station receives the broadcast timing from the base station at different times depending on its current distance from the base station.

The mobile station monitors clock drift by comparing the time when a new frame starts on the broadcast channel with the time when the integral part of its internal clock/SFN counter is incremented. When a difference is detected the mobile station adjusts its internal clock/SFN counter to compensate for that difference. Thus, based on that broadcast time or SFN, the mobile station adjusts its own internal clock or system frame number counter to synchronize to that time (block 40). The adjustment is preferably made in one or more small incremental changes, e.g., one-eighth chip, at a different time than when the base station adjusted its own timer. In the SFN counter example, the adjustment(s) could be made during even (or odd) system frame numbers if the base station adjusts its time during odd (or even) system frame numbers. The result is a maximum time shift for a received signal of only a single incremental change per adjustment, (in the example, one-eighth chip), rather than a potential maximum timing adjustment, (in the example, one-fourth of a chip).

Figure 3:
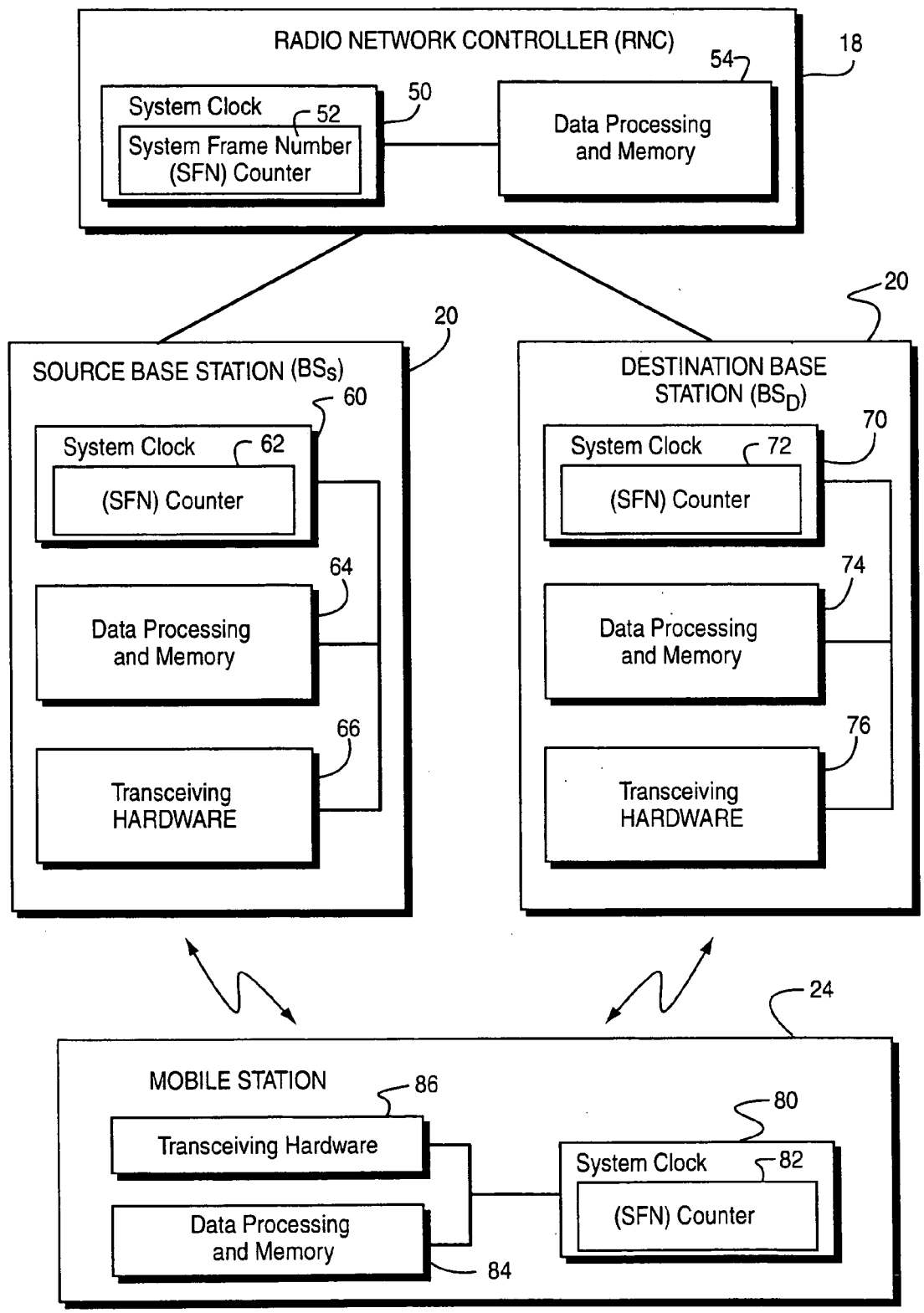
FIG. 3 is a function block diagram illustrating an example implementation of the present invention in the context of the example cellular radio communications system shown in FIG. 1.

FIG. 3 shows a function block diagram of an example implementation in the context of a diversity handover using the system shown in FIG. 1. The radio network controller 18 includes a system clock 50 along with a system frame number counter 52 which supply timing information to the data processing and memory circuitry 54. The radio network controller 18 receives timing reports from the source base station ($BS_s$) and destination base station ($BS_D$) as defined by their respective system clocks 60, 70 and/or their respective system frame number counters 62, 72. The system clock 60 and system frame number counter 62 provides timing and frame control signals to source base station data processing and memory circuitry 64 and transceiving hardware 66. The system clock 70 and system frame number counter 72 provide timing and frame control signals to destination base station data processing and memory circuitry 74 and transceiving hardware 76. The mobile station 24 also contains a system clock 80 which may include a system frame number counter 82. The system timing and frame information is provided to data processing and memory circuitry 84 and transceiving hardware 86.

The source and destination base stations receive a timing adjustment from the radio network controller 18 and their respective processing circuitry adjusts their respective system clocks and/or system frame number counters by one or more increments. In the example where the system frame number counter counts in one-eighth chip increments, the counter value may be adjusted by plus or minus one-eighth of a chip during odd frame number intervals. The data processing and memory circuitry in a mobile station alters the value in its system frame number counter 82 during even frame number time intervals. Of course, the base station could adjust its timing during even frame number intervals and the mobile station during odd frame number intervals.

While the present invention has been described in terms of a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. In a radio communications network including a base station communicating over a radio interface with a mobile station, a method comprising:
    determining a first reference timing adjustment for the base station and a second reference timing adjustment for the mobile station;
    effecting a change in a reference timing of the base station only during one or more odd-numbered time intervals using the first reference timing adjustment, the base station reference timing being used by the base station to determine a time when a block of information starts or ends; and
    effecting a change in a reference timing of the mobile station only during one or more even-numbered time intervals using the second reference timing adjustment, the mobile station reference timing being used by the mobile station to determine a time when the block of information starts or ends.

2. The method in claim 1, wherein the determining step includes:
    determining a difference between the base station timing and a radio network controller timing, and
    determining the first reference timing adjustment based on the difference.

3. The method in claim 2, further comprising:
    comparing the difference with a threshold, and
    if the difference exceeds the threshold, determining the first reference timing adjustment.

4. The method in claim 1, further comprising:
    adjusting the base station timing incrementally during a first set of time intervals, and
    adjusting the mobile station timing incrementally during a second set of time intervals.

5. The method in claim 1, wherein the time intervals correspond to frames.

6. The method in claim 1, wherein the mobile station is in diversity handover with a first and a second base station, further comprising:
    determining a third reference timing adjustment for the second base station;
    effecting a change in a reference timing of the first and second base stations based on the first and third timing adjustments; and effecting a change in a reference timing of the mobile station during a time interval different from when the reference timing of the first or the second base station is changed.

7. The method in claim 1, wherein the block of information is a frame.

8. In a radio communications network including a base station communicating over a radio interface with a mobile station, a method comprising:
determining a first reference timing adjustment for the base station and a second reference timing adjustment for the mobile station;
effecting a change in a reference timing of the base station only during one or more even-numbered time intervals using the first reference timing adjustment, the base station reference timing being used by the base station to determine a time when a block of information starts or ends; and
effecting a change in a reference timing of the mobile station only during one or more odd-numbered time intervals using the second reference timing adjustment, the mobile station reference timing being used by the mobile station to determine a time when the block of information starts or ends.

9. A base station coupled to a radio network controller for communicating with a mobile station over a radio interface, comprising:
a base station frame number counter for generating a reference timing used by the base station to determine a time when a block of information starts or ends; and
means for receiving a timing adjustment from the radio network controller and adjusting the base station frame number counter only during one or more odd-numbered frames while the mobile station may only make a reference timing adjustment during one or more even-numbered frames.

10. The base station in claim 9, wherein the block of information is a frame.

11. A base station coupled to a radio network controller for communicating with a mobile station over a radio interface, comprising:
a base station frame number counter for generating a reference timing used by the base station to determine a time when a block of information starts or ends; and
means for receiving a timing adjustment from the radio network controller and adjusting the base station frame number counter only during one or more even-numbered frames while the mobile station may only make a reference timing adjustment during one or more odd-numbered frames.

12. A mobile station for communicating with a base station over a radio interface, the base station being coupled to a radio network controller, comprising:
a mobile station frame number counter for generating a reference timing used by the mobile station to determine a time when a block of information starts or ends; and
means for detecting a timing signal from the base station and adjusting the frame number counter only during one or more odd-numbered frames, and wherein the base station only makes a reference timing adjustment during one or more even-numbered frames.

13. The base station in claim 12, wherein the block of information is a frame.

14. A mobile station for communicating with a base station over a radio interface, the base station being coupled to a radio network controller, comprising:
a mobile station frame number counter for generating a reference timing used by the mobile station to determine a time when a block of information starts or ends; and
means for detecting a timing signal from the base station and adjusting the frame number counter only during one or more even-numbered frames,
wherein the base station only makes a reference timing adjustment during one or more odd-numbered frames.

15. In a mobile radio communications system including a network control node coupled to a base station, the base station communicating with a mobile station over a radio interface, a method of synchronizing timers in each of the mobile and base stations wherein the mobile station timer is adjusted only during one or more odd timing intervals and the base station timer is adjusted only during one or more even timing intervals.

16. In a mobile radio communications system including a network control node coupled to a base station, the base station communicating with a mobile station over a radio interface, a method of synchronizing timers in each of the mobile and base stations wherein the mobile station timer is adjusted only during one or more even timing intervals and the base station timer is adjusted only during one or more odd timing intervals.

* * * * *